United States Patent
Lerer et al.

(10) Patent No.: US 10,706,074 B2
(45) Date of Patent: Jul. 7, 2020

(54) EMBEDDINGS WITH MULTIPLE RELATIONSHIPS

(71) Applicant: Facebook, Inc., Menlo Park, CA (US)

(72) Inventors: Adam Kal Lerer, New York, NY (US); Timothee Lacroix, Paris (FR); Adam Joshua Fisch, New York, NY (US); Antoine Bordes, Brooklyn, NY (US)

(73) Assignee: Facebook, Inc., Menlo Park, CA (US)

( * ) Notice: Subject to any disclaimer, the term of this patent is extended or adjusted under 35 U.S.C. 154(b) by 255 days.

(21) Appl. No.: 15/826,405

(22) Filed: Nov. 29, 2017

(65) Prior Publication Data

US 2019/0163801 A1    May 30, 2019

(51) Int. Cl.
*G06F 16/27*   (2019.01)
*G06F 16/28*   (2019.01)
*G06Q 50/00*   (2012.01)

(52) U.S. Cl.
CPC ............ *G06F 16/278* (2019.01); *G06F 16/27* (2019.01); *G06F 16/285* (2019.01); *G06Q 50/01* (2013.01)

(58) Field of Classification Search
CPC ..................................................... G06F 16/278
See application file for complete search history.

(56) References Cited

U.S. PATENT DOCUMENTS

2018/0232661 A1* 8/2018 Li ..................... G06F 16/9024

* cited by examiner

*Primary Examiner* — Van H Oberly
(74) *Attorney, Agent, or Firm* — Fenwick & West LLP (57) ABSTRACT

To generate an embedding model for entities in an online system, a first set of partitions is generated. Each partition of the first set of partitions includes a subset of entities of the online system. Each partition of at least a subset of partitions of the first set of partitions is assigned to embedding workers. Each of the embedding worker determines embedding vectors for each entity in the partition assigned to the embedding worker. A second set of partitions is generated. Each partition of at least a subset of partitions of the second set of partitions are assigned to embedding workers. Each embedding worker retrieves embedding vectors for the entities in the partition assigned to embedding worker, and determines updated embedding vectors for each of the entities based on the retrieved embedding vectors and information about interaction between the entities.

15 Claims, 8 Drawing Sheets

|    | p1 | p2 | p3 | p4 | p5 | p6 | p7 | p8 | p9 | p10 | p11 | p12 | p13 |
|----|----|----|----|----|----|----|----|----|----|-----|-----|-----|-----|
| u1 | x  | x  | x  | x  |    |    |    |    |    |     |     |     |     |
| u2 |    |    |    |    |    | x  | x  | x  |    |     |     |     |     |
| u3 |    |    |    |    | x  | x  |    |    |    |     |     |     |     |
| u4 |    |    |    |    |    |    |    | x  |    |     |     |     |     |
| u5 |    |    |    |    |    |    |    |    | x  | x   |     |     |     |
| u6 |    |    |    |    |    |    |    |    |    |     | x   | x   |     |
| u7 |    |    |    |    |    |    |    |    |    |     |     |     | x   |

| | First Set of Partitions | | | Second Set of Partitions | | | |
|---|---|---|---|---|---|---|---|
| | Epoch 1 | Epoch 2 | Epoch 3 | Epoch 4 | Epoch 5 | Epoch 6 | |
| Embedding Worker 250A | Partition 1 310A | Partition 2 310B | Partition 3 310C | Partition 1 320A | Partition 2 320B | Partition 3 320C | ... |
| Embedding Worker 250B | Partition 5 310E | Partition 6 310F | Partition 4 310D | Partition 5 320E | Partition 6 320F | Partition 4 320D | ... |
| Embedding Worker 250C | Partition 9 310I | Partition 7 310G | Partition 8 310H | Partition 9 320I | Partition 7 320G | Partition 8 320H | ... |

FIG. 5B

EMBEDDINGS WITH MULTIPLE RELATIONSHIPS

BACKGROUND

This disclosure relates generally to determining embedding vectors for entities of an online system based on interaction information between the entities of the online system.

Some online systems, such as a social networking system, provides content items to users based on models that attempt to score or rank the content available in the online system based on a likelihood that a user will be interested in the content item. In large online systems, the amount of content available can be very large. In this scenario, processing all or a large portion of the content available to be presented to the user may be unfeasible by the online system. For instance, processing all or a large portion of the content available to be presented to the user may take too much time or too many computing resources. As such, content items that the user might be interested in might be overlooked because the online system does not have enough resources to score or rank those content items.

Embedding vectors can be used to identify content items that a user may be interested in. For instance, if embedding vectors may be generated such that the vectors are correlated to historic interactions between users and content items in the online system. As such, the online system may determine a likelihood of a user being interested in a particular content item based on the distance or angle between the embedding vector of the user and the embedding vector of the content item. However, for large online systems, generating embedding vectors can be a time consuming task. Furthermore, as the size of the entities in the online system increases, the amount of memory used for determining the embedding vectors also increases.

SUMMARY

Embedding vectors are determined in parallel by multiple embedding workers. Each of the embedding workers determines the embedding vectors for a partition that is assigned to the embedding worker. To allow the embedding workers to determine the embedding vectors in parallel, the partitions that are assigned to the embedding workers are disjoint from each other.

The embedding vectors are updated in multiple epochs. During each epoch, a set of partitions are generated and the embedding vectors are updated by the multiple embedding workers based on information related to the interaction between the entities in the partition.

More specifically, to generate an embedding model for entities in an online system, a first set of partitions is generated. Each partition of the first set of partitions includes a subset of entities of the online system. Each partition of at least a subset of partitions of the first set of partitions is assigned to embedding workers. Each of the embedding worker determines embedding vectors for each entity in the partition assigned to the embedding worker. The embedding vectors are determined based on information about interactions between entities in the partition assigned to the embedding worker. A second set of partitions is generated. Each partition of at least a subset of partitions of the second set of partitions are assigned to embedding workers. Each embedding worker retrieves embedding vectors for the entities in the partition assigned to embedding worker, and determines updated embedding vectors for each of the entities based on the retrieved embedding vectors and information about interaction between the entities.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
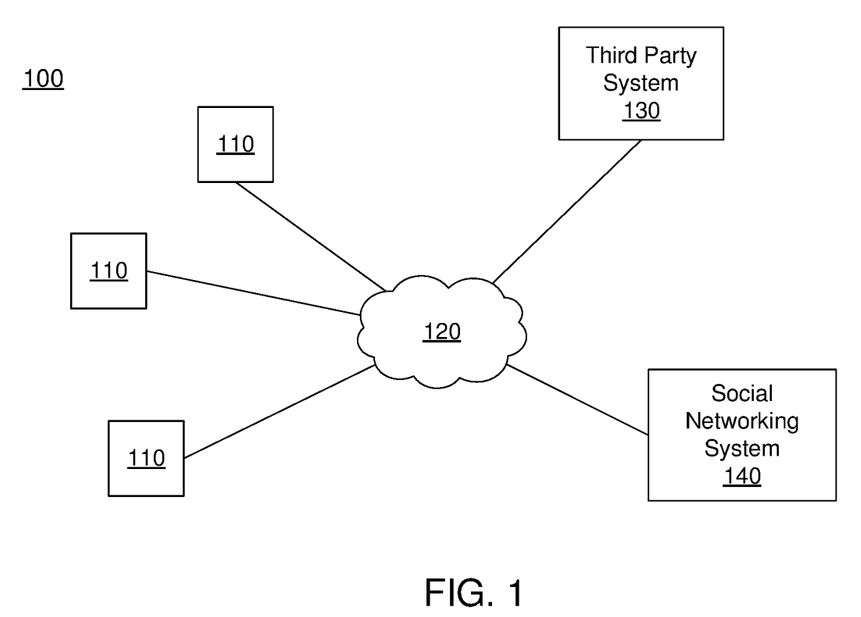
FIG. 1 is a block diagram of a system environment in which an online system operates, in accordance with an embodiment.

FIG. 1 is a block diagram of a system environment 100 for an online system 140, in accordance with an embodiment. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The online system 140 selects content items for presentation to users using client devices 110. To select the content items for presentation to the users, the online system models the users and the content items as embedding vectors represented in latent space. Content items are then selected based on the distance between a user's embedding vector and the embedding vectors of various content items.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
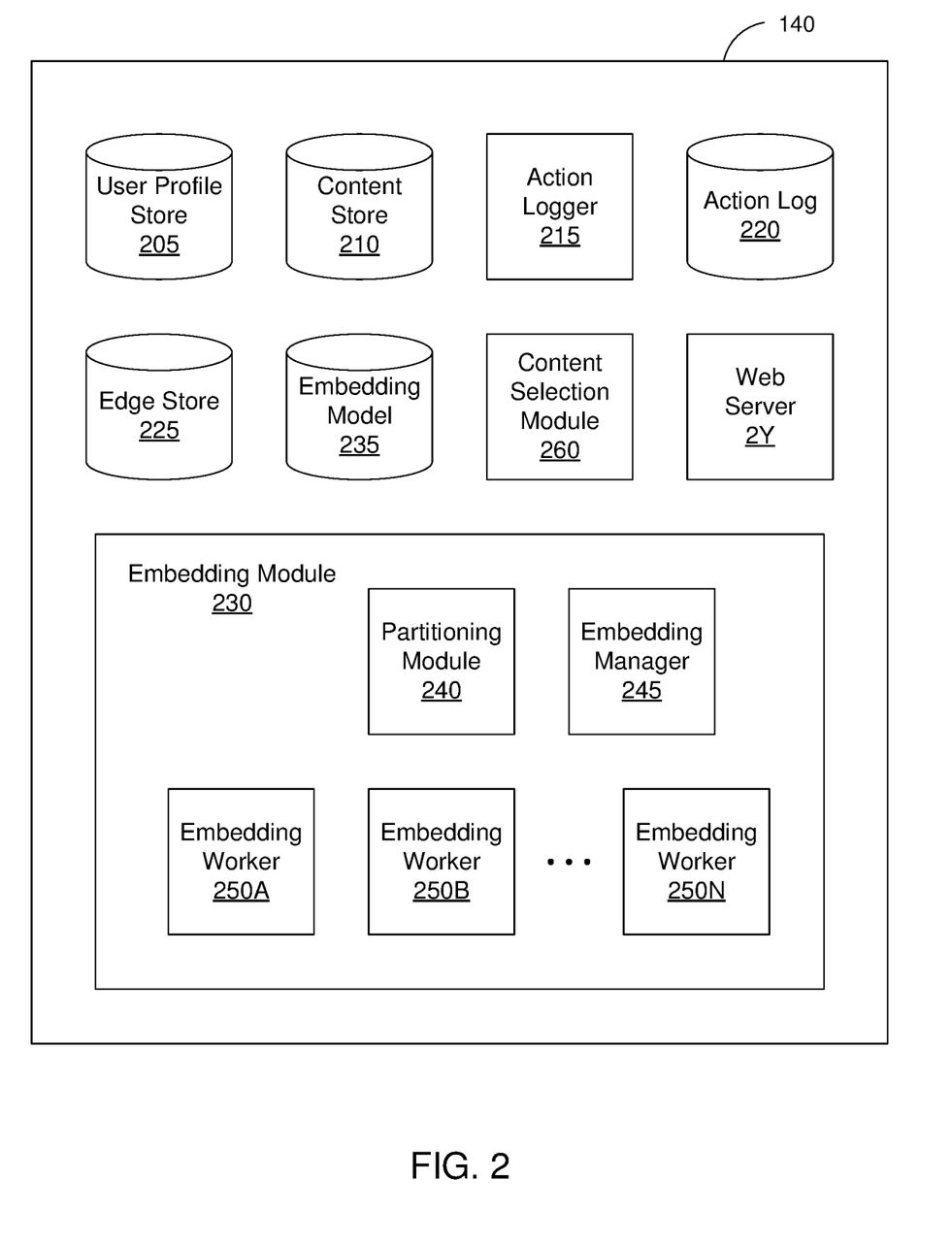
FIG. 2 is a block diagram of an online system, in accordance with an embodiment.

FIG. 2 is a block diagram of an architecture of the online system 140, in accordance with an embodiment. The online system 140 shown in FIG. 2 includes a user profile store 205, a content store 210, an action logger 215, an action log 220, an edge store 225, an embedding module 230, an embedding model 235, a content selection module 260, and a web server 270. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The embedding module 230 applies machine learning techniques to generate an embedding model 235 that includes embedding vectors for entities of the social networking system 140 that describes the entities in latent space. As used herein, latent space is a vector space where each dimension or axis of the vector space is a latent or inferred characteristic of the objects in the space. Latent characteristics are characteristics that are not observed, but are rather inferred through a mathematical model from other variables that can be observed.

The embedding module 230 generates embedding vectors for users and pages of the social networking system. In some embodiments, the embedding module 230 generates embedding vectors for content (e.g., stories, posts, and advertisements) items stored in the content store 210.

The embedding model 235 is trained based on engagement between users and pages or users and content items. That is, the embedding model 235 is trained so that the distance between the embedding vectors of a user and the embedding vectors of pages or content items that the user engaged with is reduced.

In some embodiments, the embedding module 230 updates the embedding model 235 by generating embedding vectors for users, pages, or contents based on a previously generated embedding vector. That is, an updated embedding vector for a user can be generated based on a previously generated embedding vector for the user and additional information about the interaction between the user and pages or content items of the online system.

Figure 3A:
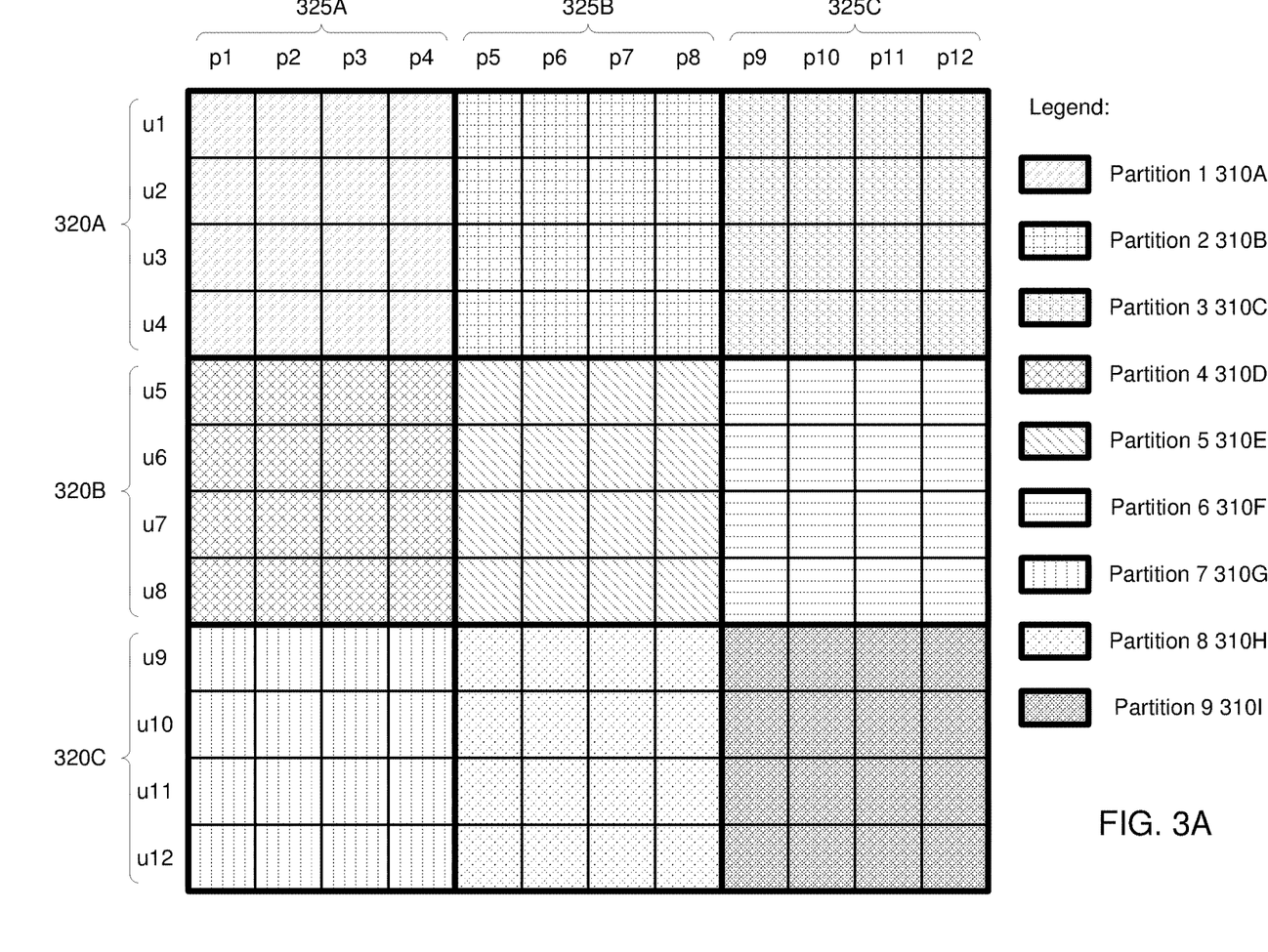
FIG. 3A illustrates an example table showing user interaction with pages of an online system, in accordance with an embodiment.
Figure 3B:
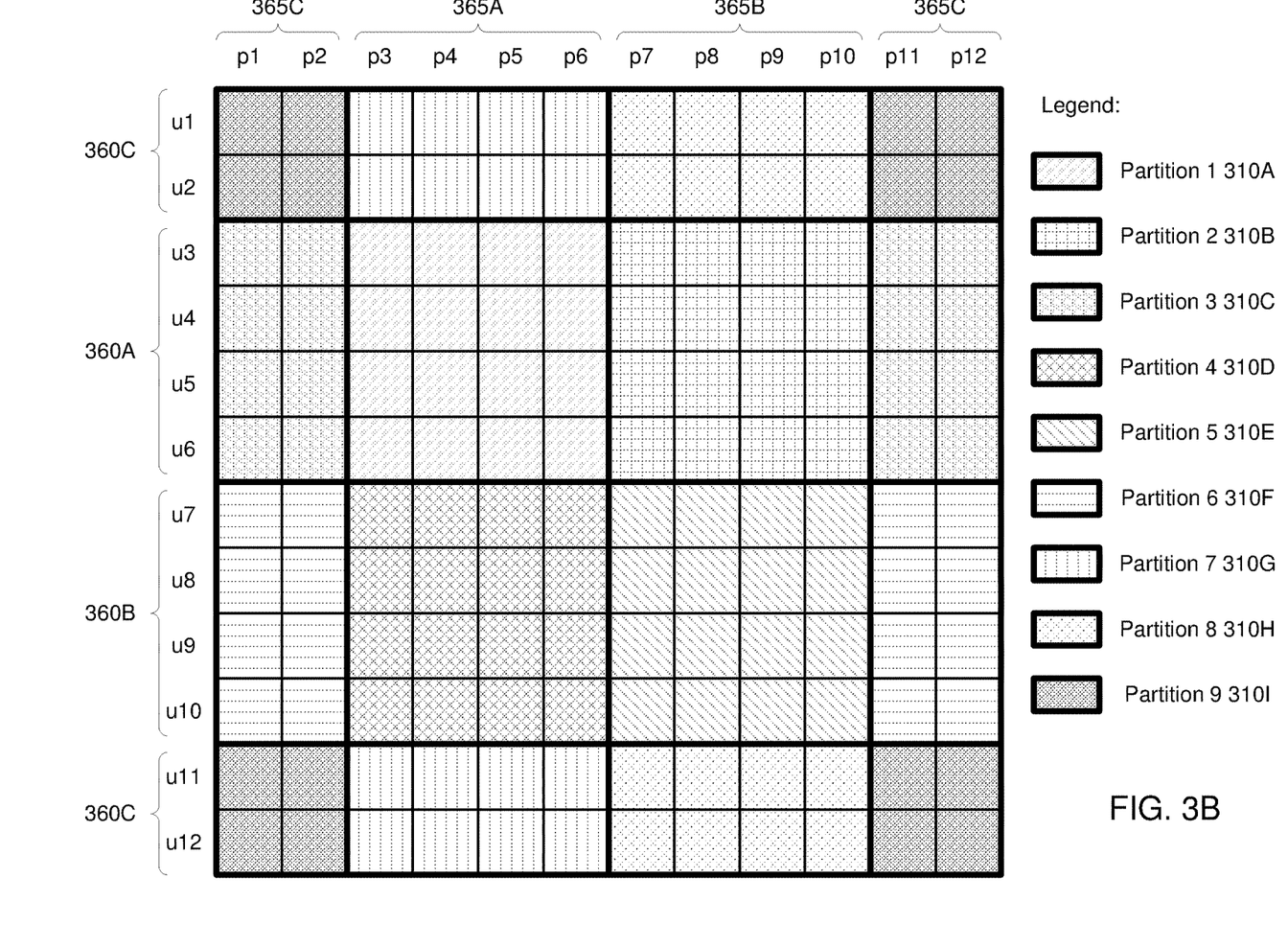
FIG. 3B illustrates an example of a two dimensional latent space where 20 entities are represented, according to one embodiment.

FIG. 3A illustrates an example table showing user interaction with pages of an online system, in accordance with an embodiment. FIG. 3B illustrates an example of a two dimensional latent space where 20 entities are represented, according to one embodiment. The example two dimensional latent space includes 7 users (u1 through u7) and 13 pages (p1 through p13).

In the example of FIG. 3B, since user u1 has interacted with pages p1 through p4, the vector for user u1 is in closer proximity to the vectors for pages p1 through p4 than the vectors for pages p5 though p13. Similarly, the vector for user u2 is in close proximity with the vectors for pages p6, p7 and p8, the vector for user u3 is in close proximity with the vector for pages p5 and p6, and the vector for user u4 is in close proximity with the vector for page u4. Even though user u2 has not interacted with pages p1 through p5 and p9 through p13, a determination of the likelihood of user u2 interacting with each of pages p1 through p5 and p9 through p13 can be made by determining the distance between the vector for user u2 and each of the vectors for pages p1 through p5 and p9 through p13. As such, a determination may be made that user u2 is more likely to interact with page p5 than pages p1 though p4 and p9 through p13.

Referring back to FIG. 2, the embedding module 230 includes a partitioning module 240, an embedding manager 240, and multiple embedding workers 250.

The partition module 240 generates partitions that each includes a subset of users of the online system, and a subset of pages or content items of the online system. The embedding module 240 generates embedding vectors based on the elements of each partition independently. That is, the embedding vectors for the elements of a specific partition are determined based on information associated with the other elements in the specific partition and ignoring the information associated with elements that are not in the specific partition. As such, the amount of memory used by embedding module 240 is dependent on the size of the partition, is less than the amount of memory used if the embedding module 240 were to generate the embedding vectors based on information associated with every element of the online system. In some embodiments, the partition module 240 generates sets of disjoint partitions. That is, each of the partitions in a set of partitions include a unique set of users and a unique set of pages or content items. In other embodiments, the partition module 240 divides the users of the online system into multiple user groups, and divides the pages or content items into multiple content groups. The partition module 240 then permutes each of the user groups with each of the content groups to generate a set of partitions.

In some embodiments the partition module 240 generates a new set of partitions based on a previously generated set of partitions. For example, the partition module 240 substitutes a set number of users from one partition with users from one or more other partitions of the previously generated set of partitions to generate a partition for a new set of partitions. Similarly, the partition module 240 substitutes a set number of pages or content items from one partition with pages or content items from one or more other partitions of the previously generated set of partitions to generate a partition for a new set of partitions.

Figure 4A:
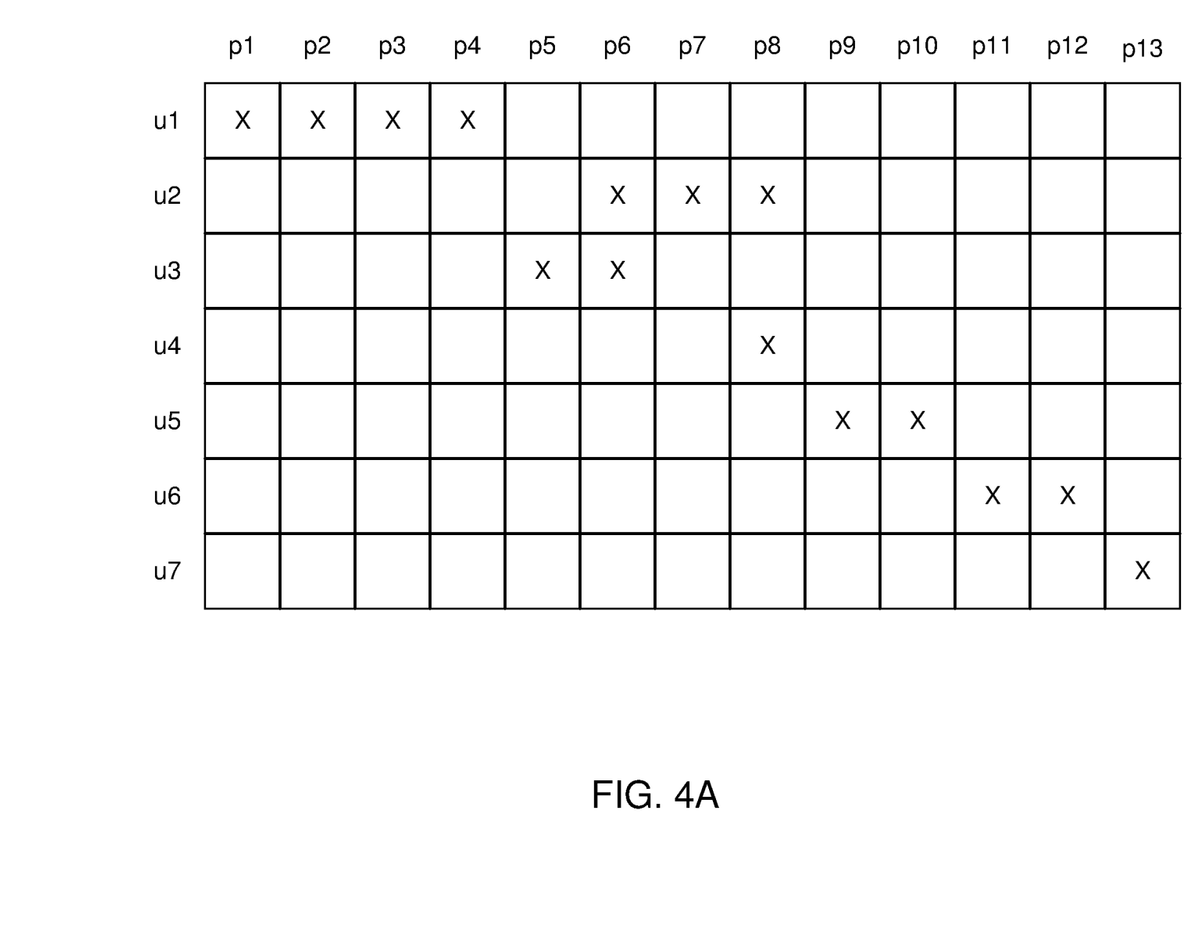
FIG. 4A illustrates a first set of partitions generated by the partition module, in accordance with an embodiment.
Figure 4B:
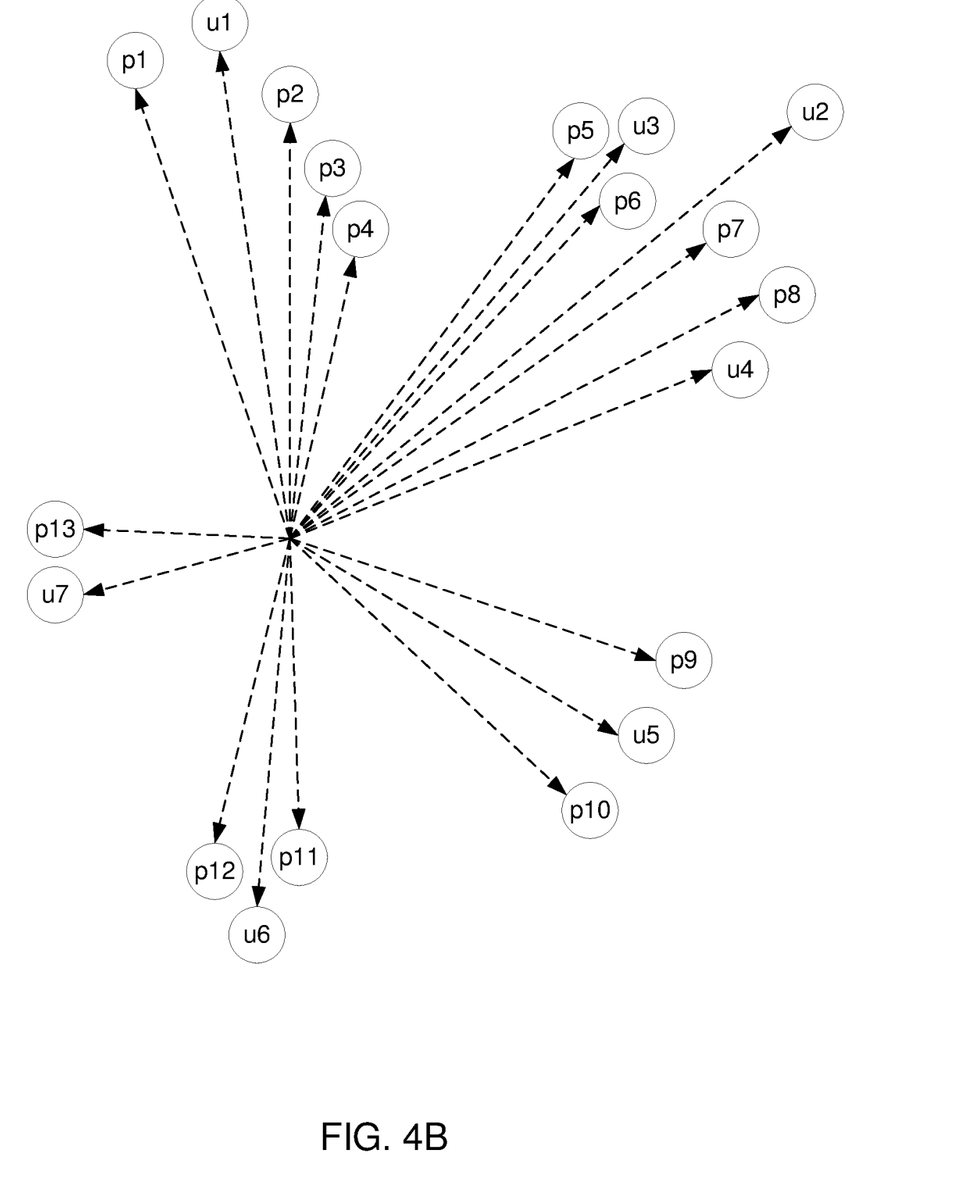
FIG. 4B illustrates a second set of partitions generated by the partition module, in accordance with an embodiment.

FIG. 4A illustrates a first set of partitions generated by the partition module 240 and FIG. 4B illustrates a second set of partitions generated by the partition module 240, in accordance with an embodiment. Each set of partitions shown in FIGS. 4A and 4B include 9 partitions illustrated by different shading. In the first set of partitions shown in FIG. 4A, the partition module 240 grouped users u1 through u12 into three groups 420A through 420C. Group 420A includes users u1 through u4, group 420B includes users u5 through u8, and group 420C includes users u9 through u12. The partition module 240 further grouped pages p1 through p12 into three groups 425A through 4225C. Group 425A includes pages p1 through p4, group 425B includes pages p5 through p8, and group 425C includes pages p9 through p12.

The partition module then permutes each of the users groups 420A through 420C with each of the pages groups 425A through 425C. Thus, the partition module generates partition 1 410A by combining users group 420A with pages group 425A, generates partition 2 410B by combining users group 420A with pages group 425B, generates partition 3 410C by combining users group 420A with pages group 425C, and so on.

In the second set of partitions shown in FIG. 4B, the partition module 240 generated new users group 460A by replacing users u1 and u2 from the users group 420A of the first set of partitions with users u5 and u6, generated new users group 460B by replacing users u5 and u6 from the users group 420B of the first set of partitions with users u9 and u10, and generated new users group 460C by replacing users u9 and u10 from the users group 420C of the first set of partitions with users u1 and u2. Similarly, the partition module 240 generated new pages group 465A by replacing pages p1 and p2 from the pages group 425A of the first set of partitions with pages p5 and p6, generated new pages group 465B by replacing pages p5 and p6 from the pages group 425B of the first set of partitions with pages p9 and p10, and generated new pages group 465C by replacing pages p9 and p10 from the pages group 425C of the first set of partitions with pages p1 and p2.

In other embodiments, the partition module 240 generates a set of partitions by randomly grouping users and randomly grouping pages or content items. Each time a new set of partitions is to be generated, the partition module 240 randomly groups the users and the pages or content items and combines the user pages with the pages groups to generate each of the partitions of the set of partitions being generated.

The embedding manager 245 assigns tasks to each of the embedding workers 250 to perform. The embedding manager 245 selects a partition from a set of partitions generated by the partition module 240 and assigns the selected partition to an embedding worker 250. The embedding manager 245 assigns different partitions to multiple embedding workers 250. Each of the embedding workers 250 then determines embedding vectors for the elements in the partition assigned to the embedding worker based on information associated with the elements that are in the partition. As such, each of the embedding workers 250 may work on their respective partitions in parallel. Furthermore, since an embedding worker 250 does not use information associated with elements that are not within the partition assigned to the embedding worker, the amount of memory used by the embedding worker 250 is reduced.

The embedding manager 245 additionally manages conflicts between the work performed by each of the embedding workers 250. The embedding manager 245 manages conflicts by controlling which partitions each of the embedding workers 250 concurrently work on. That is, the embedding manager 245 only assigns a partition to an embedding worker 250 if the partition being assigned does not conflict with any of the partitions the other embedding workers 250 are currently working on.

For example, for the set of partitions shown in FIG. 4A, the embedding manager 245 concurrently assigns partition 1 410A to a first embedding worker 250A, assigns partition 5 410E to a second embedding worker 250B, and assigns partition 9 410I to a third embedding worker 250C. As such, none of the work performed by the embedding workers 250 conflict with each other.

When assigning a partition to an embedding worker 250, the embedding manager 245 identifies a partition that does not conflict with partitions that are already assigned to other embedding workers 250. For instance, if partition 1 410A is currently assigned to an embedding worker 250A, the embedding manager 245 determines that partition 2 410B, partition 3 410C, partition 4 410D, and partition 7 410G conflict with partition 1 410A. As such, embedding manager 245 may only assign partition 5 410E, partition 6 410F, partition 8 410H, or partition 9 410I to a second embedding worker 250B. Embedding workers 250 are assigned to non-conflicting partitions to enable the embedding workers to work in parallel. If a first embedding worker and a second embedding worker are assigned conflicting partitions, the second embedding worker may not start determining embedding vectors for the elements in the partition assigned to the second embedding worker until the first embedding worker finished determining the partition vectors for the partition assigned to the first embedding worker.

In other embodiments, the embedding manager 245 assigns partitions to embedding workers 250 in various epochs. As used herein, an epoch is an update cycle of the embedding model (i.e., one iteration for updating the embedding model 235). During each epoch, the embedding vectors in the embedding model are only updated once based a single partition. In each epoch, the embedding manager identifies a set of partitions that do not conflict with each other and assigns a different partition to each of the available embedding workers 250. The embedding manager waits until every embedding worker 250 finishes working on their respective assigned partition before moving to a next epoch.

For example, for the set of partitions of FIG. 4A, the embedding manager 245 divides the work into three epochs. The first epoch may include partition 1 410A, partition 5, 410E, and partition 9 410I. The second epoch may include partition 2 410B, partition 6 410F, and partition 7 410G. The third epoch may include partition 3 410C, partition 4 410D, and partition 8 410H.

The embedding workers 250 generates embedding vectors for each of the entities in a partition assigned to the embedding worker 250. The embedding workers 250 retrieve an embedding vector for each of the entities in a partition from the embedding model 235, updates the embedding vectors based on the interactions between the entities included in the partition, and stores the updated embedding vectors back in the embedding model 235.

The embedding workers 250 generates the embedding vectors using a stochastic gradient descent algorithm based the interactions between users and pages. The embedding workers 250 identifies positive training samples and negative training samples to generate the embedding vectors.

The positive training samples are identified as user-page pair for which the user has interacted with the page. For instance, a positive training sample is a user-page pair, for which the user has liked the page. In the example of FIG. 3A, the positive training samples are (u1,p1), (u1,p2), (u1, p3), (u1,p4), (u2,p6), (u2,p7), (u2,p8), (u3,p5), (u3,p6), (u4,p8), (u5,p9), (u5,p10), (u6,p11), (u6,p12), and (u7,p13). In some embodiments, the embedding worker generates a positive training set by selecting a subset of positive training samples available. In other embodiment, where the positive training samples are sparse, the embedding workers 250 use every positive training sample available to generate the embedding vectors.

The negative training samples are randomly selected from the user-page pairs for which the users have not interacted with the pages. In the example of FIG. 3A, the negative training samples are randomly selected from the entries that are not marked with an "X." The negative training samples are randomly selected because the training data includes information related to a lack of interaction between a user and a page, but does not include information related to an explicit identification that a user does not want to interact with a page. That is, the fact that a user did not interact with a page does not necessarily mean that the user is not interested in the page.

In some embodiments, the embedding workers 250 determines different embedding vectors for each type of interaction. That is, an embedding worker 250 determines a first set of embedding vectors for users and pages in a partition based on "likes" given by the users to each of the pages, a second set of embedding vectors based on "shares" performed by the users, and a third set of embedding vectors based on comments provided by the users for the pages in the partition. That is, each of the different actions (e.g., likes, shares, and comments) are used as an input to train a separate set of embedding vectors. Since each of the actions are independent from each other (i.e., a user taking one of the actions for a specific content item does not imply that the user will take another action for the same specific content item), each of the set of embedding vectors for each of the different types of action will be independent from each other.

In other embodiments, a single partition is assigned to multiple embedding workers 250 and each embedding worker 250 determines embedding vectors based on different types of interactions. That is, a first embedding worker 250 determines embedding vectors for users and pages in the partition based on "likes," and a second embedding worker 250 determines embedding vectors for the users and pages in the partition based on "shares."

In some embodiments, the embedding workers 250 additionally determine a function based on embedding vectors determined based on a first type of interaction and embedding vectors determined based on a second type of interactions. For instance, the function g: X→Y determined by the embedding workers 250 is an affine function:

$$g(x|A,\Delta)=Ax+\Delta$$

Where X is a latent space determined based on the first type of interaction, Y is a latent space determined based on the second type of interaction, x is a vector in X, A is a linear transformation (e.g., a matrix) on X, and Δ is a vector in Y.

In some embodiments, the function g: X→Y is determined by trying to reduce the distance between the projected vectors in Y for entities of the online system and the embedding vectors in Y for the respective entity.

In other embodiments, the function g: X→Y is determined the distance between $g(u_i)$ and $g(p_j)$ is reduced for users $u_i$ that had the second type of interaction with pages $p_j$. That is, for the set of positive samples based on the second type of interactions, the function $$f=\cos(g(u_i),g(p_j))$$

is reduced. In some embodiments, a first function $g^u$: X→Y is determined to map users and a second function $g^p$: X→Y is determined to map pages.

In some embodiments, the function g: X→Y is determined or updated during each epoch. That is, an embedding worker 250 determines or updates the function g: X→Y based on information associated with the elements in the partition assigned to the embedding worker 250 and shares the determined function with other embedding workers.

The content selection module 260 identifies entities to present to users based on the embedding vectors determined for each of the entities in the social networking system. In some embodiments, the content selection module 260 provides entity recommendations based on the distance between the embedding vector of entities and an embedding vector for a user (user-entity recommendations). To provide the user-entity recommendations, the content selection module 260 may calculate a cosine similarity score between embedding vectors of target entities the user has not previously interacted with and the embedding vector of the user, rank the target entities based on the cosine similarity scores, and select the top rated ranked entities to be recommended to the user.

In other embodiments, the content selection module 260 provides entity recommendations to a target user based the entities previously interacted by other users with user embedding vectors that are close to the user embedding vector of the target user (user-user recommendations). To provide the user-user recommendations, the content selection module 260 determines cosine similarity scores between the embedding vector of multiple other users and the embedding vector of the target user. The content selection module 260 then ranks the other users based on the cosine similarity scores and selects entities previously interacted by the top ranked users for being recommended to the target user.

In yet other embodiments, the content selection module 260 provides entity recommendations to a target user based on the similarity of entities the user has not interacted with and entities the user has previously interacted with (entity-entity recommendations). To provide the entity-entity recommendations, the content selection module 260 determines cosine similarity scores between the embedding vectors of multiple entities the user has not interacted with and the embedding vector of an entity the user has previously interacted with. The content selection module 260 then ranks the entities based on the cosine similarity scores and selects the top ranked entities to be recommended to the user.

Since the number of entities in a social networking system may be large, exhaustive search may not be realistically possible. Instead, the content selection module 260 may partition the search space based on predetermined rules and then may perform a more exhaustive search in one or more partitions. For instance, the content selection module 260 filters out entities with embedding vectors that are not in same orthant or hyperoctant as the embedding vector for the user. As used herein, an orthant or a hyperoctant is the n-th dimensional analogue of a quadrant in a plane. As such, the content selection module 260 may be able to discard entities with embedding vectors that are not within a threshold proximity of the embedding vector of the user without having to determine the distance or the angle between each of the embedding vectors for the entities and the embedding vector for the user The web server 270 links the online system 140 via the network 120 to the one or more client devices 110, as well as to the one or more third party systems 130. The web server 270 serves web pages, as well as other content, such as JAVA®, FLASH®, XML and so forth. The web server 270 may receive and route messages between the online system 140 and the client device 110, for example, instant messages, queued messages (e.g., email), text messages, short message service (SMS) messages, or messages sent using any other suitable messaging technique. A user may send a request to the web server 270 to upload information (e.g., images or videos) that are stored in the content store 210. Additionally, the web server 270 may provide application programming interface (API) functionality to send data directly to native client device operating systems, such as IOS®, ANDROID™, or BlackberryOS.

Embeddings Generation

Figure 5A:
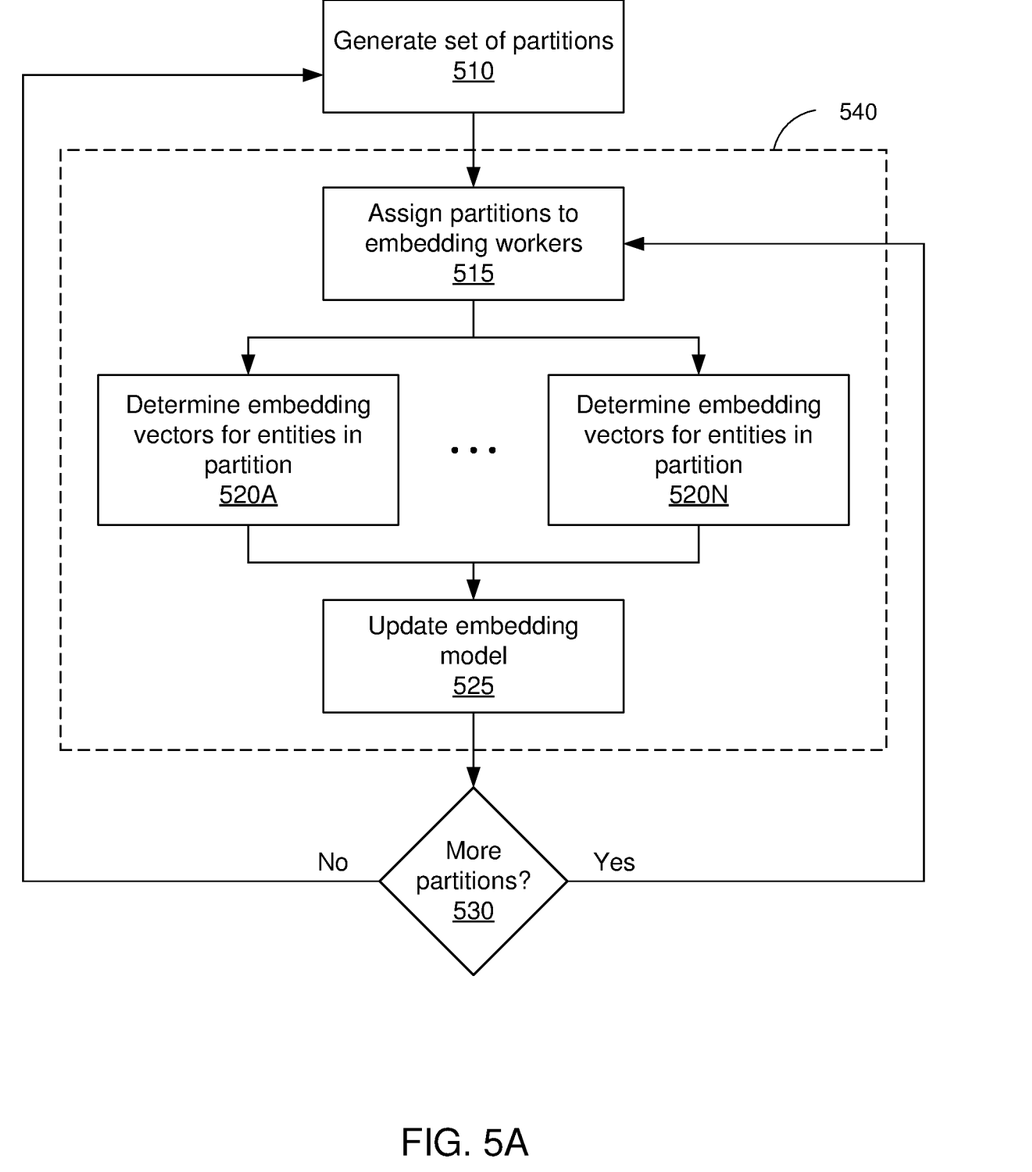
FIG. 5A is a flow diagram of a process for generating embedding vectors for entities of an online system, in accordance with an embodiment.

FIG. 5A is a flow diagram of a process for generating embedding vectors for entities of an online system, in accordance with an embodiment. The partition module 240 generates 510 a set of partitions. Each partition of the set of partitions includes a subset of entities of the online system. In some embodiments the partition module 240 generates the set of partitions in response to an instruction received from the embedding manager 245.

The embedding manager 245 assigns 515 partitions to multiple embedding workers 250. The embedding manager 245 assigns mutually disjoint partitions to each of the embedding workers 250. In some embodiments, the embedding manager 245 divides the partitions in a set of partitions into one or more epochs. For example, the set of partitions shown in FIGS. 4A and 4B can each be divided into three epochs. During each iteration 540 the embedding manager 245 assigns each of the partitions of an epoch to an embedding worker 250.

Each of the embedding workers 250 determines 520 a set of embedding vectors for each of the entities in their respective partitions based on available interaction information between the different entities included in their respective partitions. Each of the embedding workers may retrieve embedding vectors for each of the entities in a partition from the embedding model 235, and determines a new embedding vector for each of the entities in the partition based on the retrieved embedding vectors and available information about the interactions between the entities of the partition.

The embedding model 235 is updated 525 based on the embedding vectors determined by each of the embedding workers 250. In some embodiments, each of the embedding workers may update the embedding model 235 as the embedding worker 250 finishes working on the partition assigned to it. In other embodiments, the embedding workers 250 provide the determined embedding vectors to the embedding manager 245 and the embedding manager 245 updates the embedding model 235. The embedding manager 245 may then update the embedding model 235 in real time, as each of the embedding workers 250 finishes working on the partitions assigned to them, or may update the embedding model 235 once all the embedding workers 250 are done working on all of the partitions in one epoch.

In each epoch 540, one or more partitions are assigned to each embedding worker 250 and the embedding vectors for the entities of the online system are updated. At the end of an epoch 540, the embedding manager 245 makes a determination 530 whether the set of partition includes additional partitions. If the set of partition includes additional partitions, a next epoch is started using a second subset of partitions. Otherwise, if all partitions of the set of partitions have been considered, the partition module 240 generates 510 a new set of partitions and a next epoch is started using at least a subset of partitions of the new set of partitions.

Figure 5B:
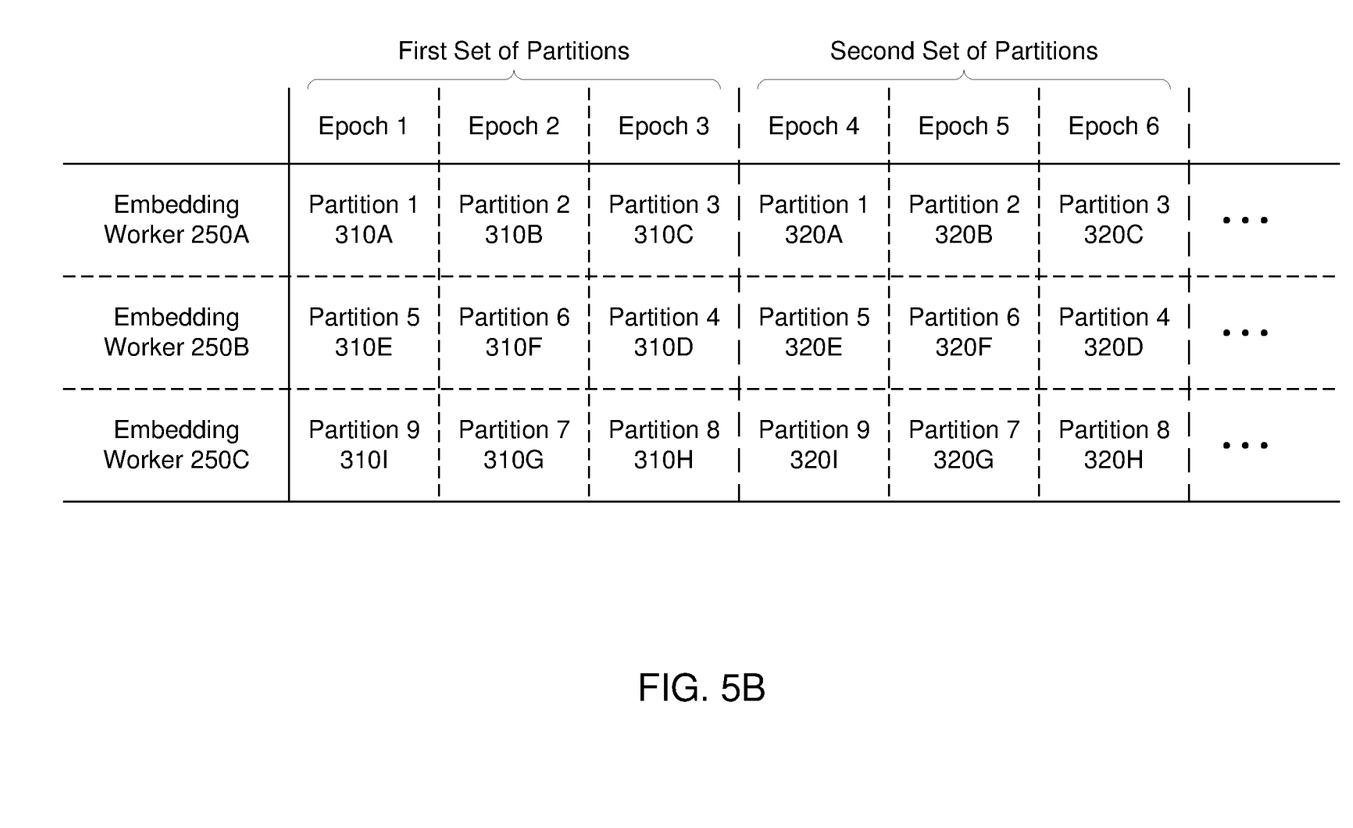
FIG. 5B illustrates a timing diagram of an embedding module performing the method of FIG. 5A, in accordance with an embodiment.

FIG. 5B illustrates a timing diagram of an embedding module 230 performing the method of FIG. 5A, in accordance with an embodiment. For the example of FIG. 5B, at step 510, the partition module 240 generates the first set of partitions shown in FIG. 4A. During epoch 1, at step 515, the embedding manager 245 assigns partition 1 410A to embedding worker 250, assigns partition 5 410E to embedding worker 250B, and assigns partition 9 410I to embedding worker 250C. Then, at step 520, each of the embedding workers 250A through 250C determines embedding vectors for the entities of their respective partitions, and at step 525, the embedding model 235 is updated.

At the end of epoch 1, since there additional partitions left to be worked on, a second epoch is started. During epoch 2, the embedding manager 245 assigns partition 2 410B, partition 6 410F, and partition 7 410G to the embedding workers 250. Similarly, during epoch 3, the embedding manager 245 assigns partition 3 410C, partition 4 410D, and partition 8 410H to the embedding workers 250.

At the end of epoch 3, the embedding manager 245 determines that the partition workers 250 have worked on all partitions of the first set of partition. As such, the partition module 240 generates the second set of partitions shown in FIG. 4B, and the process is repeated using the newly generated set of partitions.

By generating the set of partitions and assigning the partitions to multiple embedding workers 250, the embedding module 230 beneficially reduces the amount of memory used by each embedding worker 250 and reduces the amount of time for generating the embedding vectors. Since each of the embedding workers 250 only handles the entities included in one partition, the embedding workers 250 can generate the embedding vectors for the entities included in their respective partitions by only loading into memory information related to those entities, thus reducing the amount of memory used by an embedding worker 250 by an amount proportional to the size of each partition. Moreover, since the workload is distributed among multiple embedding workers 250, the generation of the embedding vectors can be parallelized, thus reducing the amount of time that takes for generating the embedding vectors for every entity of the online system.

In some embodiments, the accuracy of the embedding module reduces as the size of the partitions reduces. That is, when generating the embedding vectors, as the size of the partitions reduces, each of the embedding workers 250 has a smaller number of positive training samples and negative training samples to generate the embedding vectors. As such, the size of the partitions is chosen to improve the efficiency of the embedding module 230 while maintaining a certain degree of accuracy.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   iteratively updating embedding vectors for entities of an online system over a plurality of epochs, comprising:
   during a first epoch:
      generating a first set of partitions, each partition of the first set of partitions including a subset of entities of the online system;
      assigning each partition of at least a subset of partitions of the first set of partitions to embedding workers of a plurality of embedding workers;
      for each embedding worker having a partition of the first set of partitions assigned:
         determining embedding vectors for each entity in the partition assigned to the embedding worker based on information about interactions between entities in the partition assigned to the embedding worker; and
   during a second epoch, after the first epoch:
      generating a second set of partitions, the second set of partitions different than the first set of partitions;
      assigning each partition of at least a subset of partitions of the second set of partitions to embedding workers of the plurality of embedding workers; and
      for each embedding worker having a partition of the second set of partitions assigned:
         retrieving embedding vectors determined during the first epoch for each entity in the partition assigned to the embedding worker, and
         determining updated embedding vectors for each entity in the partition assigned to the embedding worker based on the retrieved embedding vectors determined during the first epoch and information about interactions between entities in the partition assigned to the embedding worker.

2. The method of claim 1, wherein the first set of partitions includes a first subset of partitions and a second subset of partitions, and wherein determining the embedding vectors comprises:
   determining initial embedding vectors for the entities of the online system based on the first subset of partitions of the first set of partitions; and determining the embedding vectors based on the initial embedding vectors and the second subset of partitions of the first set of partitions.

3. The method of claim 2, wherein the partitions in the first subset of partitions are disjoint from each other, and the partitions in the second subset of partitions are disjoint from each other.

4. The method of claim 1, wherein each partition includes a subset of users of the online system and a subset of pages of the online system, and wherein determining the embedding vectors comprises:
    determining embedding vectors for the subset of users and the subset of pages based on interactions between users of the subset of users and pages of the subset of pages.

5. The method of claim 1, wherein generating a first set of partitions comprises:
    grouping users of the online system into a first plurality groups;
    grouping pages of the online system into a second plurality of groups; and
    generating the first set of partitions by combining each user group of the first plurality of groups with each page group of the second plurality of groups.

6. A non-transitory computer readable storage medium storing instructions, the instructions when executed by a computer case the computer to:
    iteratively update embedding vectors for entities of an online system over a plurality of epochs, comprising:
        during a first epoch:
            generate a first set of partitions, each partition of the first set of partitions including a subset of entities of the online system;
            assign each partition of at least a subset of partitions of the first set of partitions to embedding workers of a plurality of embedding workers;
            for each embedding worker having a partition of the first set of partitions assigned:
                determine embedding vectors for each entity in the partition assigned to the embedding worker based on information about interactions between entities in the partition assigned to the embedding worker; and
        during a second epoch, after the first epoch:
            generate a second set of partitions, the second set of partitions different than the first set of partitions;
            assign each partition of at least a subset of partitions of the second set of partitions to embedding workers of the plurality of embedding workers; and
            for each embedding worker having a partition of the second set of partitions assigned:
                retrieve embedding vectors determined during the first epoch for each entity in the partition assigned to the embedding worker, and
                determine updated embedding vectors for each entity in the partition assigned to the embedding worker based on the retrieved embedding vectors determined during the first epoch and information about interactions between entities in the partition assigned to the embedding worker.

7. The computer readable storage medium of claim 6, wherein the first set of partitions includes a first subset of partitions and a second subset of partitions, and wherein determining the embedding vectors comprises:
    determine initial embedding vectors for the entities of the online system based on the first subset of partitions of the first set of partitions; and
    determine the embedding vectors based on the initial embedding vectors and the second subset of partitions of the first set of partitions.

8. The computer readable storage medium of claim 7, wherein the partitions in the first subset of partitions are disjoint from each other, and the partitions in the second subset of partitions are disjoint from each other.

9. The computer readable storage medium of claim 6, wherein each partition includes a subset of users of the online system and a subset of pages of the online system, and wherein determining the embedding vectors comprises:
    determine embedding vectors for the subset of users and the subset of pages based on interactions between users of the subset of users and pages of the subset of pages.

10. The computer readable storage medium of claim 6, wherein generating a first set of partitions comprises:
    group users of the online system into a first plurality groups;
    group pages of the online system into a second plurality of groups; and
    generate the first set of partitions by combining each user group of the first plurality of groups with each page group of the second plurality of groups.

11. A system comprising:
    a processor; and
    a non-transitory computer readable storage medium storing instructions, the instructions when executed by the computer case the computer to:
    iteratively update embedding vectors for entities of an online system over a plurality of epochs, comprising:
        during a first epoch:
            generate a first set of partitions, each partition of the first set of partitions including a subset of entities of the online system;
            assign each partition of at least a subset of partitions of the first set of partitions to embedding workers of a plurality of embedding workers;
            for each embedding worker having a partition of the first set of partitions assigned:
                determine embedding vectors for each entity in the partition assigned to the embedding worker based on information about interactions between entities in the partition assigned to the embedding worker; and
        during a second epoch, after the first epoch:
            generate a second set of partitions, the second set of partitions different than the first set of partitions;
            assign each partition of at least a subset of partitions of the second set of partitions to embedding workers of the plurality of embedding workers; and
            for each embedding worker having a partition of the second set of partitions assigned:
                retrieve embedding vectors determined during the first epoch for each entity in the partition assigned to the embedding worker, and
                determine updated embedding vectors for each entity in the partition assigned to the embedding worker based on the retrieved embedding vectors determined during the first epoch and information about interactions between entities in the partition assigned to the embedding worker.

12. The system of claim 11, wherein the first set of partitions includes a first subset of partitions and a second subset of partitions, and wherein determining the embedding vectors comprises:

determine initial embedding vectors for the entities of the online system based on the first subset of partitions of the first set of partitions; and determine the embedding vectors based on the initial embedding vectors and the second subset of partitions of the first set of partitions.

13. The system of claim 12, wherein the partitions in the first subset of partitions are disjoint from each other, and the partitions in the second subset of partitions are disjoint from each other.

14. The system of claim 11, wherein each partition includes a subset of users of the online system and a subset of pages of the online system, and wherein determining the embedding vectors comprises:

determine embedding vectors for the subset of users and the subset of pages based on interactions between users of the subset of users and pages of the subset of pages.

15. The system of claim 11, wherein generating a first set of partitions comprises:

group users of the online system into a first plurality groups;

group pages of the online system into a second plurality of groups; and generate the first set of partitions by combining each user group of the first plurality of groups with each page group of the second plurality of groups.

* * * * *

UNITED STATES PATENT AND TRADEMARK OFFICE
CERTIFICATE OF CORRECTION

PATENT NO. : 10,706,074 B2
APPLICATION NO. : 15/826405
DATED : July 7, 2020
INVENTOR(S) : Adam Kal Lerer et al.

Page 1 of 1

It is certified that error appears in the above-identified patent and that said Letters Patent is hereby corrected as shown below:

In the Claims

Column 15, Line 18, In Claim 5, after "plurality", insert --of--
Column 16, Line 17, In Claim 10, after "plurality", insert --of--
Column 17, Line 20, In Claim 15, after "plurality", insert --of--

Signed and Sealed this
Seventeenth Day of November, 2020

Andrei Iancu
*Director of the United States Patent and Trademark Office*